(12) United States Patent
Du et al.

(10) Patent No.: US 10,310,934 B2
(45) Date of Patent: Jun. 4, 2019

(54) METHODS AND SYSTEMS FOR DIAGNOSING A CONTROLLER AREA NETWORK

(71) Applicant: GM GLOBAL TECHNOLOGY OPERATIONS LLC, Detroit, MI (US)

(72) Inventors: Xinyu Du, Oakland Township, MI (US); Shengbing Jiang, Rochester Hills, MI (US); Qi Zhang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 15/499,795

(22) Filed: Apr. 27, 2017

(65) Prior Publication Data

US 2018/0314572 A1 Nov. 1, 2018

(51) Int. Cl.
*G06F 11/00* (2006.01)
*G06F 11/07* (2006.01)
*G06F 11/30* (2006.01)
*G06F 11/34* (2006.01)

(52) U.S. Cl.
CPC ........ *G06F 11/079* (2013.01); *G06F 11/0709* (2013.01); *G06F 11/0739* (2013.01); *G06F 11/3013* (2013.01); *G06F 11/349* (2013.01)

(58) Field of Classification Search
CPC .............. G06F 11/0739; G06F 11/079; G06F 11/3013; G06F 11/349
See application file for complete search history.

(56) References Cited

U.S. PATENT DOCUMENTS

| | | | | |
|---|---|---|---|---|
| 2008/0221751 A1* | 9/2008 | Fink | ..................... | G01R 31/007 701/33.4 |
| 2009/0132110 A1* | 5/2009 | Fink | ..................... | G01R 31/007 701/31.4 |
| 2015/0082096 A1* | 3/2015 | Jiang | .................... | G06F 11/3006 714/37 |
| 2015/0113328 A1* | 4/2015 | Jiang | ..................... | G06F 11/079 714/37 |
| 2015/0346259 A1* | 12/2015 | Jiang | ................... | H04L 43/0811 324/538 |
| 2015/0346260 A1* | 12/2015 | Jiang | ................... | G06F 11/0739 324/538 |
| 2016/0163125 A1* | 6/2016 | Kim | ....................... | G07C 5/008 701/31.4 |
| 2017/0221069 A1* | 8/2017 | Remboski | ............ | G07C 5/0825 |

* cited by examiner

*Primary Examiner* — Charles Ehne
(74) *Attorney, Agent, or Firm* — Lorenz & Kopf LLP

(57) ABSTRACT

Methods and system are provided for monitoring a controller area network (CAN) bus. In one embodiment, a method includes: receiving fault data associated with the CAN bus; processing, by a processor, the fault data with a software based method to determine a first propositions set; processing, by the processor, the fault data with a hardware based method to determine a second proposition set; processing, by the processor, the first propositions set and the second proposition set to determine a fault decision; and generating, by the processor, a diagnosis of the CAN bus based on the fault decision.

17 Claims, 3 Drawing Sheets

METHODS AND SYSTEMS FOR DIAGNOSING A CONTROLLER AREA NETWORK

TECHNICAL FIELD

The technical field generally relates controller area networks, and more particularly relates to methods and systems for diagnosing a controller area network.

BACKGROUND

Vehicles typically include a number of controllers that are communicatively coupled through a bus. A Controller Area Network (CAN) bus is a vehicle bus that allows the controllers and other devices to communicate with each other without a host computer. Communications between controllers on the CAN bus are made according to a message-based protocol, which is designed originally for multiplex electrical wiring within automobiles, but is also used in many other vehicle and non-vehicle applications.

It is desirable to monitor the CAN bus for faults. Some monitoring systems monitor CAN bus physical layer signals e.g. measuring voltage for faults using hardware-based approach (voltage sensing circuit). Other monitoring systems monitor CAN messages, i.e. software based approach for faults.

Accordingly, it is desirable to provide methods and systems for monitoring the CAN bus using a consolidated approach. Furthermore, other desirable features and characteristics of the present invention will become apparent from the subsequent detailed description and the appended claims, taken in conjunction with the accompanying drawings and the foregoing technical field and background.

SUMMARY

Methods and system are provided for monitoring a controller area network (CAN) bus. In one embodiment, a method includes: receiving fault data associated with the CAN bus; processing, by a processor, the fault data with software based methods to determine a first propositions set; processing, by the processor, the fault data with hardware based methods to determine a second proposition set; processing, by the processor, the first propositions set and the second proposition set to determine a fault decision; and generating, by the processor, a diagnosis of the CAN bus based on the fault decision.

In one embodiment, a system includes a non-transitory computer readable medium. The non-transitory computer readable medium includes a software based solution module that receives fault data associated with the CAN bus, and that processes, by a processor, the fault data with a software based method to determine a first propositions set. The non-transitory computer readable medium further includes a hardware based solution module that processes, by the processor, the fault data with a hardware based method to determine a second proposition set. The non-transitory computer readable medium further includes an evaluation module that processes, by the processor, the first propositions set and the second proposition set to determine a fault decision. The non-transitory computer readable medium further includes a diagnosis module that, by the processor, generates a diagnosis of the CAN bus based on the fault decision.

In one embodiment, a vehicle includes a plurality of controllers communicatively coupled via a controller area network bus, wherein at least one of the controllers comprises a non-transitory computer readable medium. The non-transitory computer readable medium includes a software based solution module that receives fault data associated with the CAN bus, and that processes, by a processor, the fault data with a software based method to determine a first propositions set. The non-transitory computer readable medium further includes a hardware based solution module that processes, by the processor, the fault data with a hardware based method to determine a second proposition set. The non-transitory computer readable medium further includes an evaluation module that processes, by the processor, the first propositions set and the second proposition set to determine a fault decision. The non-transitory computer readable medium further includes a diagnosis module that, by the processor, generates a diagnosis of the CAN bus based on the fault decision.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
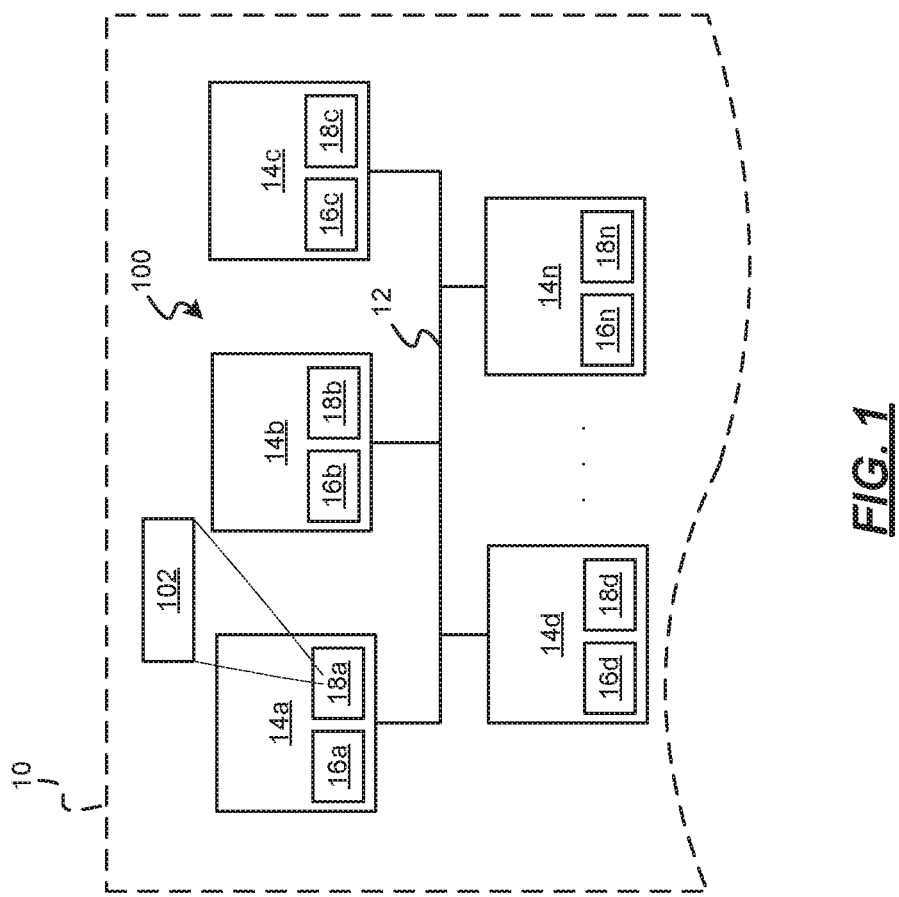
FIG. 1 is a block diagram illustrating a vehicle including a controller area network (CAN) bus and a monitoring system in accordance with various embodiments.

With reference to FIG. 1, a monitoring system shown generally at 100 is associated with a vehicle 10 in accordance with various embodiments. In general, the monitoring system 100 monitors a controller area network (CAN) bus 12 of the vehicle 10 for faults. In various embodiments, the monitoring system monitors the CAN bus 12 using both a hardware-based approach and a software-based approach to monitor fault data, performs an analysis of the fault data, and generates a fault probability. The fault probability is then used to diagnose the CAN bus.

As depicted in FIG. 1, the vehicle 10 generally includes a plurality of controllers 14a-14n that communicate over the CAN bus 12. Each of the controllers 14a-14n includes at least one processor 16a-16n and at least one computer readable storage device 18a-18n. The processors 16a-16n can be any custom made or commercially available processor, a central processing unit (CPU), a graphics processing unit (GPU), an auxiliary processor among several processors associated with the controller 14a-14n, a semiconductor based microprocessor (in the form of a microchip or chip set), a macroprocessor, any combination thereof, or generally any device for executing instructions. The computer readable storage device or media 18a-18n may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage devices or media 18a-18n may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controllers 14a-14n in controlling the vehicle 10.

The instructions may include one or more separate programs, each of which comprises an ordered listing of executable instructions for implementing logical functions. The instructions, when executed by the processors 16a-16n, receive and process signals from sensors (not shown), perform logic, calculations, methods and/or algorithms for controlling other components of the vehicle 10, and generate control signals for controlling the components of the vehicle 10 based on the logic, calculations, methods, and/or algorithms.

In various embodiments, one or more instructions 102 of at least one of the controllers 14a are embodied in the monitoring system 100, and when executed by the processor 16a, monitor the CAN bus 12 for faults (e.g., link fault, controller fault, bus shorts, or impedance faults, CAN-H ground short, CAN-L ground short, CAN-H power short, CAN-L power short, CAN-L open, CAN-H open, etc.), generates a decision and a probability of the decision based on the monitoring, and diagnoses the CAN bus 12 based on the decision and the probability. In various embodiments, one or more of the instructions, when executed by the processor 16a further set a diagnostic code associated with the CAN bus 12 and/or generate a notification signal based on the monitoring.

Figure 2:
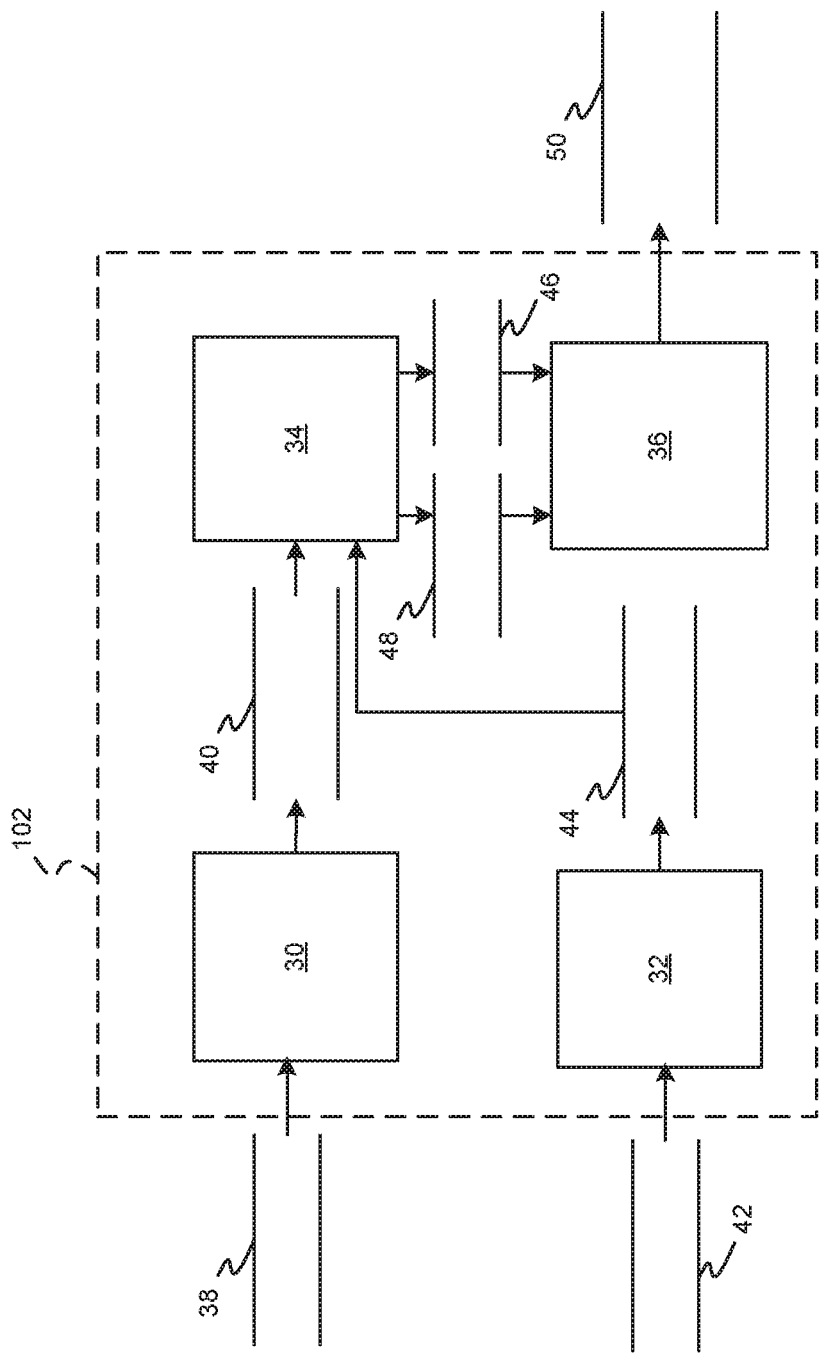
FIG. 2 is a dataflow diagram illustrating the monitoring system in accordance with exemplary embodiments.

Referring now to FIG. 2, a functional block diagram illustrates the instructions 102 of the monitoring system 100 grouped by modules in more detail. As can be appreciated, various embodiments of monitoring system 100 according to the present disclosure may include any number of sub-modules. As can further be appreciated, the sub-modules shown in FIG. 2 may be combined and/or further partitioned to similarly monitor the CAN bus 12. In various embodiments, the monitoring system includes 102 a software based solution module 30, a hardware based solution module 32, a propositions evaluation module 34, and diagnosis module 36.

The software based solution module 30 receives data 38 indicating faults on the CAN bus 12. The data 38 includes CAN messages sent from each controller 14a-14n on the CAN bus 12. For example, a message consists of 44 or more bits with a value of either 1 or 0. There is an identifier field in the CAN message indicating the message ID. Based on the vehicle signal dictionary, the message ID can be mapped to the sender controller name and acknowledged by the software based solution module 30. Based on the received data 38, the software based solution module 30 identifies a fault and generates a propositions set 40 based on software analysis methods.

For example, if a message from one controller 14b is regularly received, it indicates this controller 14b and the link between the controller 14b and the monitoring controller 14a are healthy. On the other hand, if a certain number of expected messages are missing, it indicates one or more faults may happen at the sender controller 14b or the CAN bus 12. Therefore, by monitoring these messages, the software based solution module 30 can determine the activity of each controller 14a-14n and further make the diagnostic decision.

In various embodiments, the propositions set 40 is represented as $f_{i,j}$ where i represents the fault type index (i=1, 2, . . . M) and j represents the location index (j=1, 2, . . . N) and a power set ($\Theta$) is defined as the set of each signal fault and their combination (including all possible unions and uncertainty):

$$\Theta = \{\{f_{1,1}\}, \ldots, \{f_{M,N}\}, \{f_{1,1}, f_{1,2}\}, \ldots, \{f_{1,1}, f_{1,2}, \ldots f_{M,N}\}\}.$$

Similarly, the hardware based solution module 32 receives data 42 indicating faults on the CAN bus 12. The data 42 includes some physical (electrical) measurements for CAN bus, e.g. CAN-H voltage, CAN-L voltage, bus current, bus resistance or bus capacitance. Based on the data 42, the hardware based solution module 32 identifies a fault and generates a propositions set 44 based on hardware analysis methods.

For example, the pattern for physical measurements may be evaluated for an indication of different failure causes. For example, when a short fault between CAN-H and CAN-L happens, both CAN-H and CAN-L voltage are closed to each other and approximately equal to 2.5V and the bus resistance will be very small. Similarly, other faults including CAN-H short to ground, CAN-L short to ground, CAN-H short to power, CAN-L short to power, CAN-L open, CAN-H open, reversed wire connection or terminator loss have unique fault signatures in terms of the bus voltage or other physical measurements and can be evaluated. Therefore, by monitoring these physical measurements, the hardware based solution module 33 can determine a pattern and further make the diagnostic decision.

In various embodiments, the proposition set 44 is represented as $f_{i,j}$ where i represents the fault type index (i=1, 2, ... M) and j represents the location index (j=1, 2, ... N) and a power set ($\Theta$) is defined as the set of each signal fault and their combination (including all possible unions and uncertainty):

$$\Theta = \{\{f_{1,1}\}, \ldots, \{f_{M,N}\}, \{f_{1,1}, f_{1,2}\}, \ldots, \{f_{1,1}, f_{1,2}, \ldots f_{M,N}\}\}.$$

The propositions evaluation module 34 generates a decision 46 and a probability 48 associated with the decision based on the propositions set 40 from the software based solution module 30 and the propositions set 44 from the hardware based solution module 32. As will be discussed in more detail with regard to FIG. 3, the propositions evaluation module 34 generates the decision 46 and the probability 48 based on the Dempster-Shafer evidence theory, decision-tree approach, a knowledge base, and/or other derivatives. The Dempster-Shafer theory is a mathematical approach to integrate different sources of information by considering the probability or confidence level of each source. The knowledge base is a heuristic approach to generate integrated decision from different sources of information using pre-defined rules.

The diagnosis module 36 diagnosis the CAN bus 12 based on the decision 46 and the probability 48 and generates notification signals and/or messages 50 based thereon.

Figure 3:
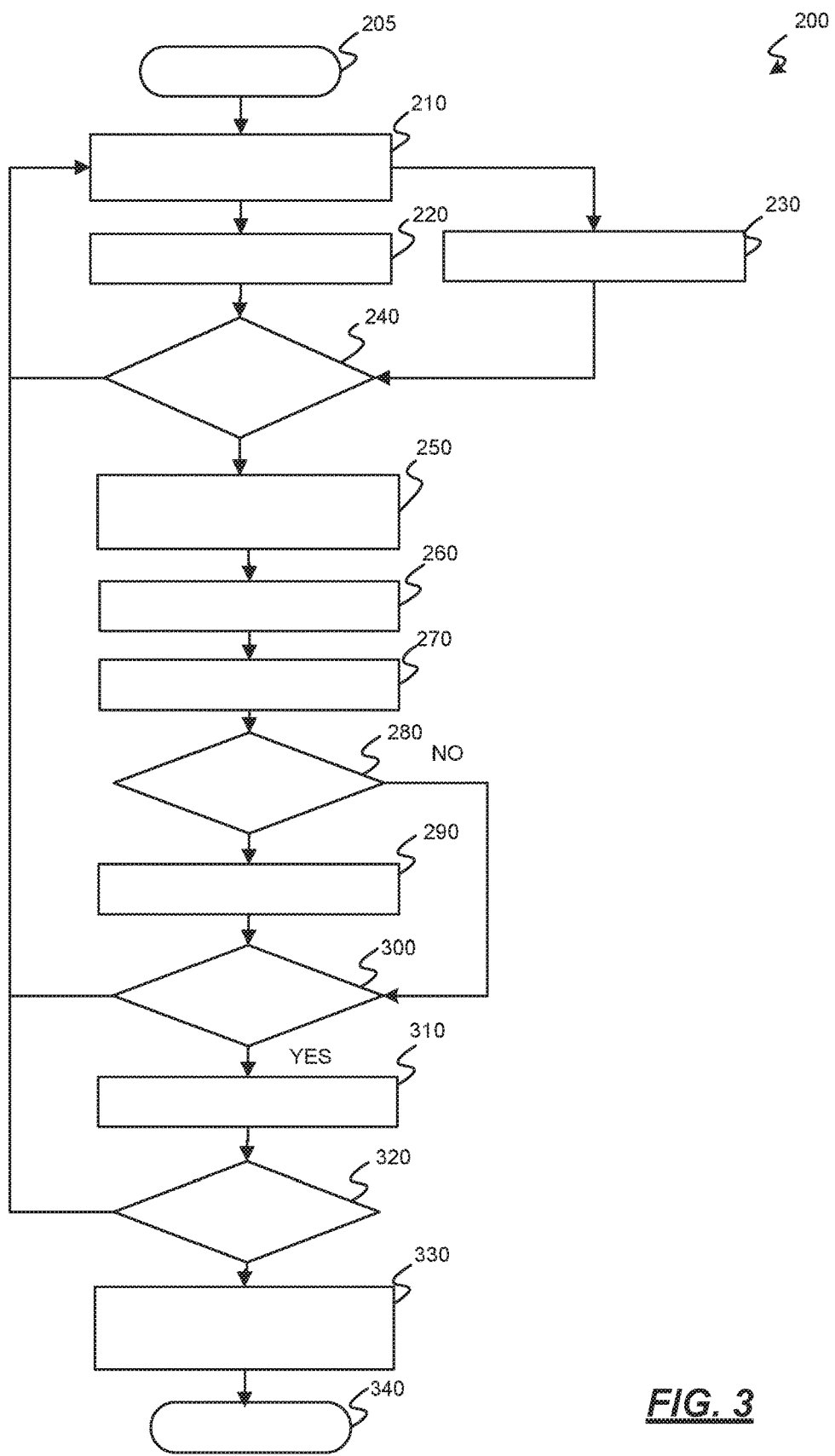
FIG. 3 is a flowchart illustrating a method that may be performed by the monitoring system in accordance with exemplary embodiments.

Referring now to FIG. 3, and with continued reference to FIGS. 1 and 2, a flowchart illustrates a monitoring method 200 that may be performed by the monitoring system 100 in accordance with various embodiments. As can be appreciated in light of the disclosure, the order of operation within the method is not limited to the sequential execution as illustrated in FIG. 3, but may be performed in one or more varying orders as applicable and in accordance with the present disclosure. The method 200 may be varied e.g. the simplification of the method 200 or the decision tree approach, if the probability is not desired. This is because the decision tree approach is a special case of the Dempster-Shafer theory approach.

In one example, the method may begin at 205. The fault data 38, 42 is loaded at 210. The propositions set 44 from the hardware based solution module 32 is determined based on the fault data 42 at 220; and a propositions set 40 from the software based solution module 30 is determined based on the fault data 38 at 230.

It is determined whether results for both hardware and software are available at 240. For example, in some instances the hardware based solution or the software based solution provides no result when data 38 or data 42, is not enough to make the decision. If results for both solutions are not available at 240, the method continues with loading more data at 210.

If, however, results for at least one of the solutions are available at 240, the method continues with computing a probability mass of both propositions sets 40, 44 and generating a decision according to the Dempster-Shafer theory at 250-270.

In particular, at 250, the probability mass contributed by the proposition set 44 of the hardware based solution to the decision is determined as $m_H(f_H)$ using, for example, the following relation:

$$m_H(f_H) = f(NH, SH), m_H(\Theta) = 1 - m_H(f_H) \quad (1)$$

and the probability mass contributed by the propositions set 40 of the software-based solution to the decision is determined as $m_S(f_S)$ using, for example, the following relation:

$$m_S(f_S) = g(W_i, M_i), m_S(\Theta) = 1 - m_S(f_S). \quad (2)$$

Where, NH represents the number of samples used in a hardware based solution. SH represents sampling rate used in the hardware based solution. $W_i$ represents a length of a monitoring window of ECU i. $M_i$ represents a message selected for monitoring ECU i's status. The probability mass functions (1) and (2) may be varied from the given form as long as they represent the probability or confidence level of hardware based solution or software based solution, respectively.

At 260, the probability mass of the fault candidate $m(f_c)$ is computed based on the probability mass contributed by the proposition set of the hardware-based solution $m_H(f_H)$ (substituted for $m_1(f_1)$) and the probability mass contributed by the proposition set of the hardware based solution $m_S(f_S)$ (substituted for $m_2(f_2)$) and using the following relations:

$$m_c(f_c) = m_1(f_1) \oplus m_2(f_2) = k \Sigma_{f_1 \cap f_2 = f_c} m_1(f_1) m_2(f_2), \text{ where}$$

$$k^{-1} = 1 - \Sigma_{f_1 \cap f_2 = \emptyset} m_1(f_1) m_2(f_2). \quad (3)$$

At 270, the decision of the final set of faults $f_I$ is computed as:

$$f_I = \begin{cases} f_H \cap f_S, & \text{if } f_H \cap f_S \neq \Phi \\ \underset{f_c}{\arg\max} \, m_c(f_c), \text{ where } f_c \in \{f_H, f_S, \Theta\} & \text{Otherwise} \end{cases} \quad (4)$$

$$m_I(f_I) = \max(m_c(f_c))$$

If however, $f_I$ is equal to null set and the knowledge library is available at 280, the final decision is recomputed using domain knowledge at 290. For example, if the decision from the software-based approach is ECU normal or network normal, and the decision from the hardware-based approach is any fault, then the integration output will be the fault reported by hardware-based approach. This scenario may be caused by intermittent fault or the fault doesn't impact bus communication.

In another example, if the decision from the software-based approach is unknown fault and the decision from the hardware-based approach is ECU ground fault, then the integration output will be the ECU ground fault. This scenario may be caused by shared ground fault. In this situation, the list of inactive ECUs will be saved for further manual diagnosis.

In still another example, if the decision from the software based approach is unknown fault and the decision from the hardware based approach is bus voltage normal, both open or network normal, then the integration output will be the ECU or power fault. This scenario may be caused by shared power fault or ECU bubbling idiot fault (abnormally keep sending messages). In this situation, the list of inactive ECUs will be saved for further manual diagnosis.

Thereafter, if the decision is not equal to the previously determined decision at 300, the method continues at 210 with loading more data 38, 42 and computing new propositions sets 40, 44. If, however, the determined decision 46 is equal to the previously determined decision at 300, then a counter C is incremented at 310 and evaluated at 320. If the counter C has not reached a threshold T1 (e.g., 3, 4, 5, or other number), or stated another way, the decision 46 has not been the same for a threshold number of iterations, the method continues with loading data at 210 and computing new propositions sets 40, 44.

Once the counter has reached a threshold at 320, a decision can be made. The fault set and the determined probability is saved and the CAN bus is diagnosed based on the saved data at 330. Thereafter, the method may end at 340.

In various embodiments, the propositions sets 40, 44 from the hardware based solution module 32 and the software based solution module 30 may be compatible. For example, assume there is a hardware fault, such as, CAN-H open fault on link 1 (between a first controller and a second controller) indicated as $f_{7,1}$. The 7-th knowledge source in the hardware based solution module 32 is considered as the output. Thus, the propositions set 44 from the hardware based solution module 32 is $\{(f_{7,1} \cup f_{7,2} \ldots \cup f_{7,13})\}$, and the propositions set 40 from software based solution module 30 is $\{(f_{6,1} \cup f_{7,1} \cup f_{10,1} \cup f_{9,14} \cup f_{10,14})\}$. Exemplary probability masses for network status identification contributed by the hardware based solution module 32 and the software based solution module 30 are computed by the propositions evaluation module 34 as:

$$m_h = \begin{bmatrix} m_h(f_{7,1} \cup f_{7,2} \ldots f_{7,13}) = 0.92 \\ m_h(\Theta) = 0.08 \end{bmatrix}, \text{ and}$$

$$m_s = \begin{bmatrix} m_s(f_{6,1} \cup f_{7,1} \cup f_{10,1} \cup f_{9,14} \cup f_{10,14}) = 0.98 \\ m_s(\Theta) = 0.02 \end{bmatrix}.$$

TABLE 1

|  | $m_s(f_s) = 0.98$ | $m_s(\Theta) = 0.02$ |
|---|---|---|
| $m_h(f_h) = 0.92$ | $m(f_h \cap f_s) = m(f_{7,1}) = 0.9016$ | $m(f_h \cap \Theta) = m(f_h) = 0.0184$ |
| $m_h(\Theta) = 0.08$ | $m(\Theta \cap f_s) = m(f_s) = 0.0784$ | $m(\Theta) = 0.0016$ |

Where $f_h \cap f_s$ represents the proposition formed by the intersection of $(f_{71} \cup f_{7,2} \ldots \cup f_{7,13})$ from the hardware based solution module and $(f_{6,1} \cup f_{7,1} \cup f_{10,1} \cup f_{9,14} \cup f_{10,14})$ from the software based solution module. $f_h \cap \Theta$ represents the proposition formed by the intersection of $(f_{7,1} \cup f_{7,2} \cup f_{7,13})$ from the hardware based solution module and the uncertainty ($\Theta$) from the software based solution module. $\Theta$ represents the intersection of the uncertainty propositions from the hardware based solution module and the software based solution module. The proposition represented by $m_h(f_{7,1})$ has the highest probability mass. Thus, the propositions evaluation module 34 selects $m_h(f_{7,1})$ as the output to represent the fusion of the evidence from the hardware based solution module 32 and the software based solution module 30 and the final decision 46 and probability 48.

In various embodiments, the propositions sets 44, 40 from the hardware based solution module 32 and the software based solution module 30 may not be compatible. For example, assume there is an ECU (RDCM) floating fault that occurred which is indicated as $f_{9,20}$. The inter-frame voltage offset due to this fault is not significant and the fault itself might not be detected by the hardware based solution module 32. As a result, the 24-th knowledge source in the hardware based solution module 32 is considered as the output. Thus, the propositions set 44 from the hardware based solution module is $\{(f_{13,1} \cup f_{13,2}, \ldots \cup f_{13,13} \cup f_{11} \cup f_{12})\}$, and the propositions set 40 from the software based solution module 30 is $\{f_{9,20}\}$. The probability masses for the network status identification contributed by the hardware based solution module 32 and the software based solution module 30 are computed by the propositions evaluation module 34 as:

$$m_h = \begin{bmatrix} m_h(f_{13,1} \cup f_{13,2,\ldots} \cup f_{13,13} \cup f_{11} \cup f_{12}) = 0.9 \\ m_h(\Theta) = 0.1 \end{bmatrix}, \text{ and}$$

$$m_s = \begin{bmatrix} m_s(f_{9,20}) = 0.98 \\ m_s(\Theta) = 0.02 \end{bmatrix}.$$

TABLE 2

|  | $m_s(f_s) = 0.98$ | $m_s(\Theta) = 0.02$ |
|---|---|---|
| $m_h(f_h) = 0.90$ | $m(f_h \cap f_s) = m(\emptyset) = 0.882$ | $m(f_h \cap \Theta) = m(f_h) = 0.018$ |
| $m_h(\Theta) = 0.10$ | $m(\Theta \cap f_s) = m(f_s) = 0.098$ | $m(\Theta) = 0.002$ |

$k^{-1} = 1 - 0.882 = 0.118$, $k = 8.475$

TABLE 3

|  | $m_s(f_s) = 0.98$ | $m_s(\Theta) = 0.02$ |
|---|---|---|
| $m_h(f_h) = 0.90$ | $m(f_h \cap f_s) = m(\emptyset) = 0$ | $m(f_h \cap \Theta) = m(f_h) = 0.1525$ |
| $m_h(\Theta) = 0.10$ | $m(\Theta \cap f_s) = m(f_s) = 0.83055$ | $m(\Theta) = 0.01695$ |

The proposition represented by $m_s(f_{9,20})$ has the highest probability mass. Thus, Thus, the propositions evaluation module 34 selects $m_s(f_{9,20})$ as the output to represent the fusion of the evidence from the hardware based solution module 32 and the software based solution module 30 and the final decision 46 and probability 48.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of monitoring a controller area network (CAN) bus, comprising:
   receiving fault data associated with the CAN bus;
   processing, by a processor, the fault data with at least one software based method to determine a first propositions set;
   processing, by the processor, the fault data with at least one hardware based method to determine a second proposition set;
   processing, by the processor, the first propositions set and the second proposition set to determine a decision;

processing, by the processor, the first propositions set and the second propositions set to determine a probability mass; and generating, by the processor, a diagnosis of the CAN bus based on the decision and the probability mass.

2. The method of claim 1, wherein the decision is based on a highest probability mass.

3. The method of claim 1, wherein the processing of the first propositions set and the second propositions set is based on Dempster-Shafer theory.

4. The method of claim 1, wherein the processing of the first propositions set and the second propositions set is based on a decision-tree approach.

5. The method of claim 1, wherein the processing the first proposition set and the second propositions set is based on a knowledge base.

6. The method of claim 1, wherein the software based method evaluates messages on the CAN bus.

7. The method of claim 1, wherein the hardware based method evaluates physical measurements of the CAN bus.

8. The method of claim 1, further comprising iterating the processing the fault data with at least one software based method, the processing the fault data with at least one hardware based method, and the processing the first propositions set and the second proposition set a number N of times before generating the diagnosis.

9. A system for monitoring a controller area network (CAN) bus, comprising:
a non-transitory computer readable medium comprising:
a software based solution module that receives fault data associated with the CAN bus, and that processes, by a processor, the fault data with a software based method to determine a first propositions set;
a hardware based solution module that processes, by the processor, the fault data with a hardware based method to determine a second proposition set;
an evaluation module that processes, by the processor, the first propositions set and the second proposition set to determine a fault decision and processes the first propositions set and the second propositions set to determine a probability mass; and a diagnosis module that, by the processor, generates a diagnosis of the CAN bus based on the fault decision and the probability mass.

10. The system of claim 9, wherein the evaluation module determines the fault decision based on a highest probability mass.

11. The system of claim 9, wherein the evaluation module processes the first propositions set and the second propositions set based on Dempster-Shafer theory.

12. The system of claim 9, wherein the evaluation module processes the first propositions set and the second propositions set based on a decision-tree approach.

13. The system of claim 9, wherein the evaluation module processes the first proposition set and the second propositions set based on a knowledge base.

14. The system of claim 9, wherein the software based method evaluates messages on the CAN bus.

15. The system of claim 9, wherein the hardware based method evaluates physical measurements of the CAN bus.

16. The system of claim 9, wherein the diagnosis module generates the diagnosis when the fault decision is determined a number N of times.

17. A vehicle, comprising:
a plurality of controllers communicatively coupled via a controller area network bus,
wherein at least one of the controllers comprises a non-transitory computer readable medium comprising:
a software based solution module that receives fault data associated with the CAN bus, and that processes, by a processor, the fault data with a software based method to determine a first propositions set;
a hardware based solution module that processes, by the processor, the fault data with a hardware based method to determine a second proposition set;
an evaluation module that processes, by the processor, the first propositions set and the second proposition set to determine a fault decision based on a Dempster-Shafer theory, and a knowledge base; and
a diagnosis module that, by the processor, generates a diagnosis of the CAN bus based on the fault decision.

* * * * *